UNITED STATES PATENT OFFICE.

SAMUEL LEWIS SUMMERS, OF PHILADELPHIA, PENNSYLVANIA.

PROCESS OF MAKING METHYLENE DIGALLATE OF BISMUTH OXYIODIDS.

SPECIFICATION forming part of Letters Patent No. 690,673, dated January 7, 1902.

Application filed November 5, 1901. Serial No. 81,259. (No specimens.)

*To all whom it may concern:*

Be it known that I, SAMUEL LEWIS SUMMERS, a citizen of the United States, residing at Philadelphia, in the State of Pennsylvania, have invented a certain new and useful Process of Producing the Methylene Digallate of Bismuth Oxyiodid, of which the following is a full, clear, and exact description.

My invention relates to a new process for making the methylene digallate of bismuth oxyiodid, a new chemical body invented or discovered by me and for which I applied for Letters Patent by application filed October 9, 1901, Serial No. 78,082. The said product of my process is the compound of bismuth oxyiodid and methylene digallic acid, and its chemical formula is $Bi_2I_2C_{15}H_{12}O_{12}$, which may be illustrated by the structural formula—

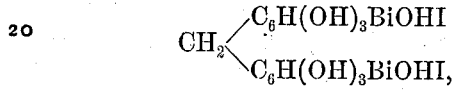

and it forms when completely purified by washing an amorphous light yellowish-brown powder, insoluble either in water or alcohol, containing about 39.33 per cent. of bismuth and about 24.1 per cent. of iodin.

I will now proceed to describe my present invention, which consists of a new, expeditious, and economical method or process for preparing this new product.

A solution is prepared of 95.4 grams of crystallized bismuth nitrate in from one hundred and twenty to one hundred and fifty cubic centimeters of glacial acetic acid. This solution is poured with constant stirring into a solution of 33.2 grains of potassium iodid and fifty grains of sodium acetate in two liters of water, in which last-mentioned solution 42.78 grains of methylene-digallic acid crystals are suspended. This latter solution is preferably heated on the water-bath to about 50° centigrade before admixing with it the first-mentioned bismuth-nitrate solution. A precipitate forms at once on bringing these two solutions together. It is at first a yellowish precipitate, but changes rapidly to a reddish-brown color, which dies to a yellowish brown. This precipitate is then to be washed, first by decantation and finally upon a filter, until the washings run off colorless and free from dissolved salts.

It is to be observed that the sodium acetate used in the process plays no part except to render the oxyiodid as first formed insoluble, and the glacial acetic acid performs in the process only the function of a solvent for the bismuth nitrate.

In this process the general procedure for the formation of bismuth oxyiodid is that usually employed for that purpose; but in my process above detailed by having the methylene digallic acid present in suspension in one of the solutions the bismuth oxyiodid in the moment of its formation—namely, in *statu nascendi*—combines with the methylene digallic acid to form the new salt. The reactions may be expressed in chemical notation as follows:

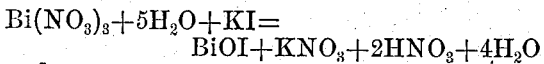

and

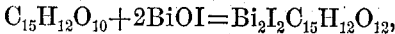

or

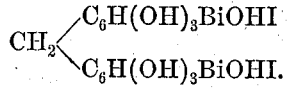

Having thus described my invention, what I claim as new, and desire to secure by Letters Patent, is—

1. The process of producing the methylene digallate of bismuth oxyiodid, which consists in first preparing a solution of bismuth oxyiodid from bismuth nitrate in the presence of glacial acetic acid as a solvent, then preparing a water solution of potassium iodid in the presence of sodium acetate to render it primarily insoluble, and adding to such solution crystallized methylene digallic acid which is held in suspension therein; then admixing the solutions and purifying the precipitate formed, by washing and filtration.

2. The process of producing the methylene digallate of bismuth oxyiodid by reacting on bismuth oxyiodid in nascent state, by a solution of potassium iodid in which is suspended the crystals of methylene digallic acid; and then purifying the precipitate formed by the resulting reaction.

In testimony whereof I have hereunto affixed my signature this 1st day of November, A. D. 1901.

SAMUEL LEWIS SUMMERS.

Witnesses:
GEO. W. REED,
H. E. BATTERSBY.